United States Patent

Meeusen

[11] Patent Number: 5,651,288
[45] Date of Patent: Jul. 29, 1997

[54] HYDRAULICALLY OPERATED FRICTION CLUTCH WITH SHIFT SHOCK PREVENTION AND METHOD OF USING SAME

[75] Inventor: Glenn Eric Meeusen, Racine, Wis.

[73] Assignee: Twin Disc, Incorporated, Racine, Wis.

[21] Appl. No.: 538,139

[22] Filed: Oct. 2, 1995

[51] Int. Cl.[6] .................................................. F16H 3/08
[52] U.S. Cl. ........................ 74/333; 74/331; 192/85 AA
[58] Field of Search ............................ 74/329, 331, 333, 74/359, 360; 192/85 AA, 109 F

[56] References Cited

U.S. PATENT DOCUMENTS

| | | | |
|---|---|---|---|
| 3,262,531 | 7/1966 | Black et al. | 192/87 |
| 3,470,988 | 10/1969 | Sieverkropp | 192/87.15 |
| 4,186,829 | 2/1980 | Schneider et al. | 192/109 |
| 4,627,302 | 12/1986 | Laylock et al. | 74/359 X |
| 4,771,647 | 9/1988 | Stevens | 74/333 X |
| 4,831,894 | 5/1989 | Braun | 74/331 X |
| 4,907,684 | 3/1990 | Breisch | 192/85 AA X |
| 5,046,595 | 9/1991 | Sumiyoshi et al. | 192/85 AA |
| 5,281,190 | 1/1994 | Koivunen | 74/333 X |
| 5,335,763 | 8/1994 | Katoh | 192/85 AA |
| 5,388,473 | 2/1995 | Black | 74/361 |
| 5,437,355 | 8/1995 | Takagi et al. | 192/85 AA X |
| 5,481,932 | 1/1996 | Downs et al. | 74/331 |
| 5,495,927 | 3/1996 | Samie et al. | 192/85 AA X |
| 5,511,644 | 4/1996 | Murata | 192/109 F X |

*Primary Examiner*—Charles A. Marmor
*Assistant Examiner*—Peter T. Kwon
*Attorney, Agent, or Firm*—Nilles & Nilles, S.C.

[57] ABSTRACT

A transmission gear train has a clutch designed to minimize shift shock upon engagement while still exhibiting relatively rapid initial engagement. To this end, a face cavity is formed in the clutch actuating piston which acts as an accumulator into which hydraulic fluid flows for a period of time after initial clutch engagement. This fluid flow causes clutch pressure to be lower than system main pressure while the accumulator is filling, thereby providing a cushioning effect which reduces shift shock. Use of the accumulator or face cavity eliminates the need for a stepped piston and the additional seals and flow passages normally required for a stepped piston, thus simplifying clutch manufacture and operation.

20 Claims, 5 Drawing Sheets

HYDRAULICALLY OPERATED FRICTION CLUTCH WITH SHIFT SHOCK PREVENTION AND METHOD OF USING SAME

BACKGROUND OF THE INVENTION

1. Field of the Invention

The invention relates to clutches and, more particularly, to hydraulically operated clutches taking measures to reduce the rate of clutch engagement, thereby reducing noise and shift shock.

2. Discussion of the Related Art

Hydraulically operated friction clutches are well known and are used in a variety of applications. For example, they are often used in the transmissions of four wheel drive vehicles to selectively couple a drive spider to one or both of the drive axles. Such clutches selectively couple a rotatable drive element (typically a shaft coupled directly to the drive spider) to a rotatable driven element (typically a pinion coupled to an output shaft either directly or through other clutches). The typical clutch includes a clutch plate stack, a stationary backplate, and a movable piston. The clutch plate stack is formed from a plurality of interleaved clutch plates extending between the drive element and the driven element. The piston is hydraulically actuatable to slide axially upon demand to compress the clutch plate stack and engage the clutch.

In the simplest hydraulically operated clutch, the entire axial surface of the piston facing away from the clutch plate stack is subjected to a uniform system pressure throughout clutch engagement. Clutches of this type are relatively inexpensive to manufacture because they do not require stepped pistons, multiple bores of various sizes supplying fluid to the pistons, or more than two seals. However, clutches of this type exhibit the disadvantage of locking up or becoming fully clamped or engaged very rapidly. Rapid engagement applies substantial shock to the driven components of the clutch and downstream devices (commonly referred to as "shift shock"), causing substantial noise or chatter and contributing to relatively rapid wear of clutch components.

Proposals have been made to reduce shift shock by reducing the rate of pressure increase in the clutch after initial engagement, thereby reducing the rate at which the percentage of torque transferred from the drive element to the driven element increases from zero to 100%. The simplest solution to the shift shock problem is to provide a restriction reducing the rate of fluid flow into the clutch actuating chamber. However, restricting the flow of fluid into the clutch chamber is only a partial solution to the problem because restricting fluid flow sufficiently to appreciably reduce shift shock also necessarily delays initiation of clutch engagement. Such delays are undesirable because most operators demand an immediate response to a clutch engagement command.

Another solution to the problem of shift shock is disclosed in U.S. Pat. No. 3,470,988 to Sieverkropp. The clutch disclosed by the Sieverkropp Patent employs a stepped actuating piston which presents a dual actuating chamber. A relatively small or inner portion of the piston freely communicates with a source of actuating fluid and thus is subjected to system pressure almost instantaneously upon generation of a clutch engagement command. A relatively large or upper surface of the piston 1) communicates with the source of fluid pressure only through a restricted feed passage and 2) has an axial passage formed therethrough.

According to the Sieverkropp specification, upon initial movement of the actuating piston, air rushes through the axial passage from the chamber containing the clutch plate stack and into the actuating chamber where it is trapped. The trapped air within the actuating chamber is said to provide a cushioning effect due to the fact that the air is somewhat compressible as compared to the oil.

The Sieverkropp clutch exhibits distinct drawbacks and disadvantages. Most notably, it is relatively expensive to manufacture for at least three reasons. First, the piston and the piston carrier must be formed with steps in them. Second, at least three sliding seals must be provided—a first to seal the inner radial end of the stepped piston with respect to the drive shaft, a second to seal the outer radial end of the stepped piston with respect to the piston carrier, and a third to seal the lower portion of the stepped piston from the upper portion, thereby providing the distinct chambers required for acceptable operation. Third, two distinct flow passages must be machined, one of which is substantially restricted, to permit the required separate supply of fluid to the first and second surfaces of the piston.

OBJECTS AND SUMMARY OF THE INVENTION

It is therefore an object of the invention to provide a hydraulically operated friction clutch which reduces shift shock by preventing the hydraulic pressure in the clutch actuating chamber from increasing to full system pressure for a period of time after initial clutch engagement, thereby allowing the clutch to lock up at less than maximum torque capacity.

Another object of the invention is to provide a hydraulically operated clutch which has the characteristics described above but does not require a stepped piston, extra seals, or special flow restrictors for shift shock reduction and which therefore is relatively inexpensive to manufacture.

In accordance with a first aspect of the invention, these objects are achieved by providing an apparatus comprising, a rotatable drive element, a rotatable driven element, and a clutch which selectively couples the drive element to the driven element. The clutch includes a plurality of interleaved clutch plates extending between the drive element and the driven element, and a hydraulically actuated piston which is slidable axially of the clutch assembly. The piston has a first axial surface subjectable to hydraulic actuating fluid and an opposed second axial surface facing the clutch plates and engaging one of the clutch plates when the clutch assembly is engaged. The second axial surface has an arcuate face cavity formed therein extending around at least substantially an entire circumference thereof, and a bore extends through the piston from the first surface to the face cavity.

In order to assure that sufficient fluid flows into the face cavity to delay clutch lock up as desired, the face cavity should have a volume of at least 2 in.$^3$.

In order to prevent the piston from sticking to the clutch plate stack, the one plate is preferably cone-shaped so as to act as a belleville spring when compressed.

As a result of the face cavity, the seal assembly which seals the piston to the piston carrier and to the shaft can consist only of a first seal which seals an inner radial portion of the piston to the shaft and a second seal which seals an outer radial portion of the piston to the piston carrier. Moreover, the fluid inlet connecting the actuating chamber to the system's pressure source can provide the sole path for fluid flow from the source to the piston.

Still another object of the invention is to provide a transmission gear train having a hydraulically operated friction clutch exhibiting the characteristics detailed above.

In accordance with another aspect of the invention, this object is achieved by providing a transmission gear train comprising a housing, a rotatable drive shaft at least partially disposed in the housing, a rotatable driven shaft, and a clutch which selectively couples the driven shaft to the drive shaft. The clutch assembly includes a piston carrier which is non-rotatably attached to the drive shaft, and a drive ring a) which is rotatably mounted on the drive shaft and b) which presents a pinion which is coupled to the driven shaft. A backplate is non-rotatably mounted on one of the drive ring and the drive shaft. The clutch further includes a hydraulically actuated piston which is slidably mounted on the drive shaft, which is sealed to the piston carrier and the drive shaft, and which defines, in combination with the backplate, the drive shaft, and the drive ring, a clutch plate chamber, and plurality of interleaved clutch plates disposed in the clutch plate chamber. The piston has a first axial surface facing the piston carrier and a second axial surface facing the clutch plates and engaging one of the clutch plates when the clutch is engaged. The second axial surface has an arcuate face cavity formed therein extending around at least substantially an entire circumference thereof. A bore extends through the piston from the first surface to the face cavity.

Yet another object of the invention is to provide an improved method of engaging a hydraulically operated friction clutch without shift shock.

In accordance with still another aspect of the invention, this object is achieved by providing a method which includes providing a clutch including 1) a clutch plate stack formed from a plurality of interleaved clutch plates extending between a rotating drive element and a rotatable driven element, and 2) a hydraulically actuated piston which is slidable axially of the clutch, the piston having a first axial surface facing an actuating chamber and an opposed second axial surface facing the clutch plates. The second axial surface has a face cavity formed therein, and a bore extends through the piston from the first surface to the face cavity. Further steps include supplying pressurized fluid to the actuating chamber to thereby 1) drive the piston into engagement with one of the clutch plates, 2) seal the piston against the one clutch plate, and 3) compress the clutch plate stack and initiate clutch engagement (the fluid pressure remaining at a pressure during this step which is insufficiently high to fully engage the clutch). Additional pressurized fluid is then supplied to the actuating chamber while filling the face cavity with pressurized hydraulic fluid flowing into the face cavity from the actuating chamber, thereby fully engaging the clutch.

Preferably, the volume of fluid flowing into the face cavity is at least 25%, and preferably between 25% and 50%, of the total volume of fluid flowing into the actuating chamber during clutch engagement.

Other objects, features and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout and in which.

DETAILED DESCRIPTION OF THE PREFERRED EMBODIMENT

1. Resume

Pursuant to the invention, a transmission gear train is provided having a clutch designed to minimize shift shock upon engagement while still exhibiting relatively rapid initial engagement. To this end, a face cavity is formed in the clutch actuating piston which acts as an accumulator into which hydraulic fluid flows for a period of time after initial clutch engagement. This fluid flow causes clutch pressure to be lower than system main pressure while the accumulator is filling, thereby providing a cushioning effect which reduces shift shock. Use of the accumulator or face cavity eliminates the need for a stepped piston and the additional seals and flow passages normally required for a stepped piston, thus simplifying clutch manufacture and operation.

2. System Overview

Figure 1:
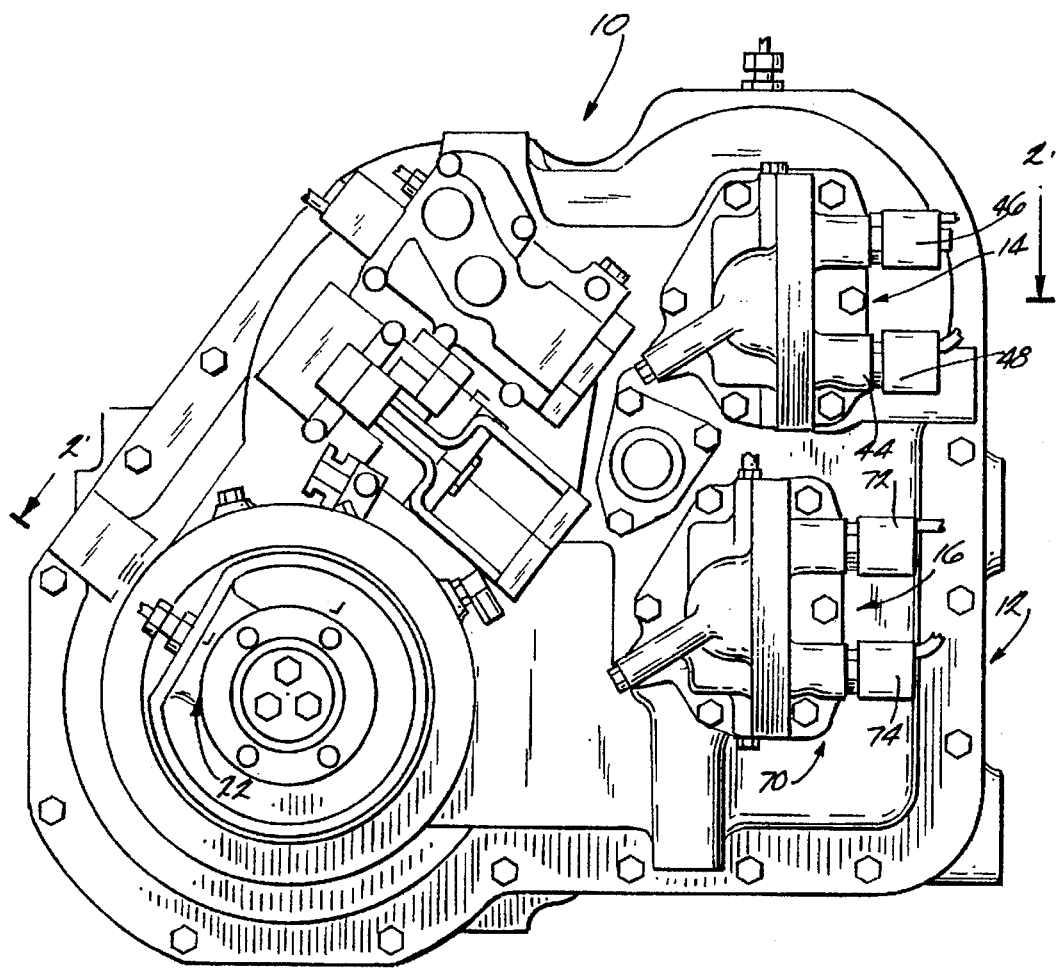
FIG. 1 is an end elevation view of a transmission employing hydraulically operated clutches constructed in accordance with the preferred embodiment of the present invention.
Figure 2:
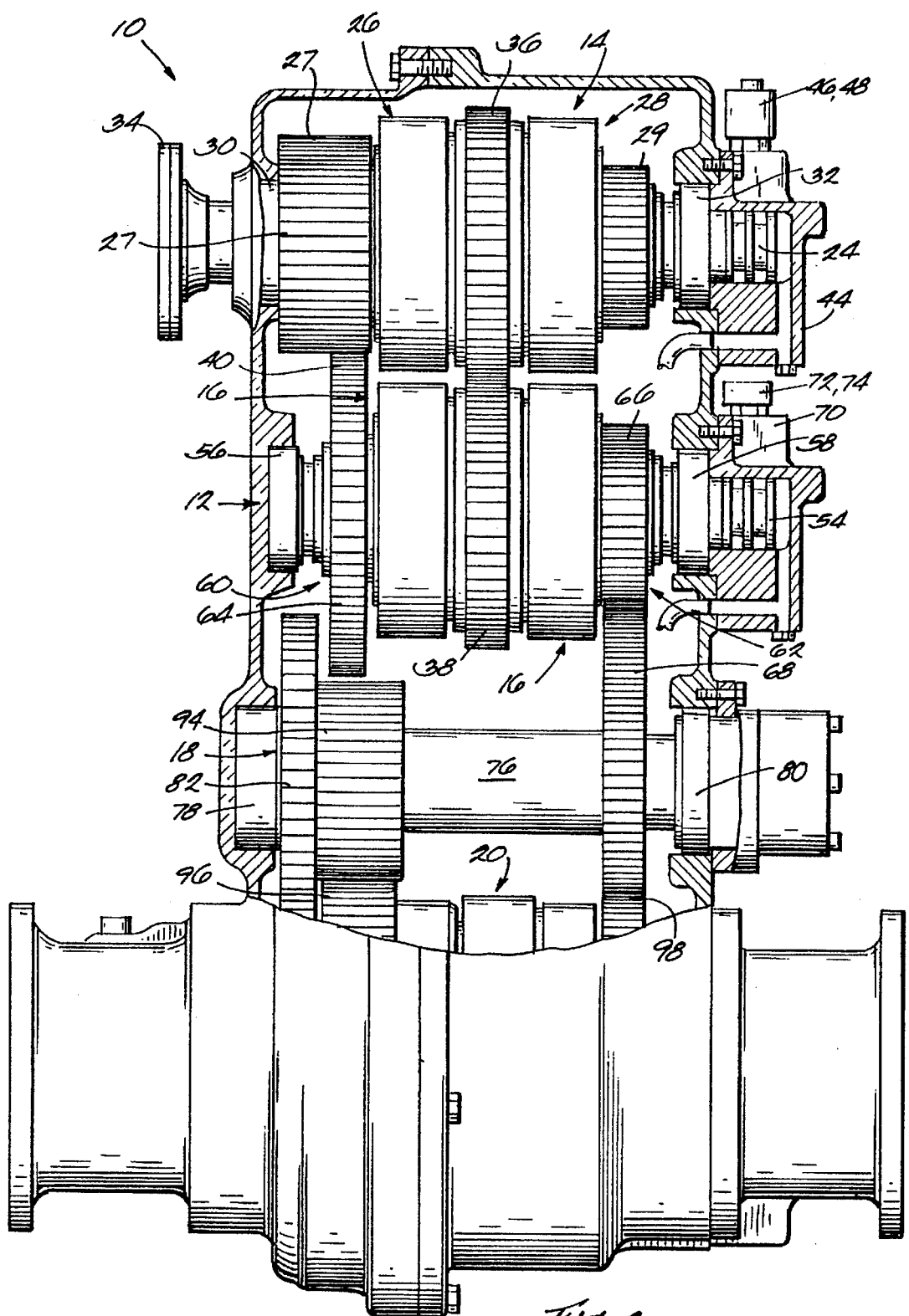
FIG. 2 is a side sectional elevation view taken generally along the lines 2—2 in FIG. 1.
Figure 3:
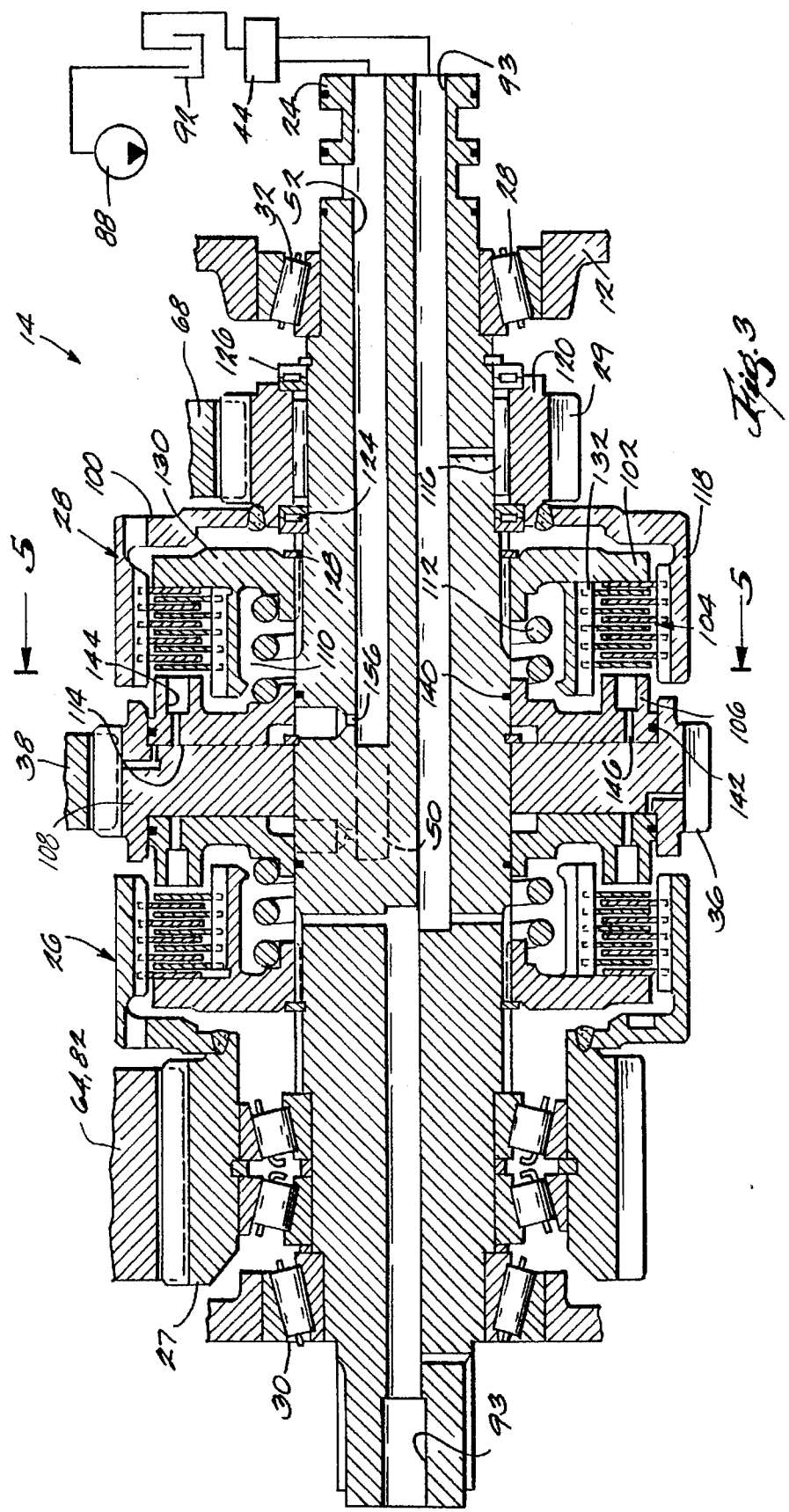
FIG. 3 is a side elevation view of one of the clutch assemblies of FIGS. 1 and 2 and illustrating clutches of this assembly in a disengaged position.

Referring now to the drawings and initially to FIGS. 1–3, several of the inventive clutches are provided in a transmission gear train 10 designed for use in a four wheel drive vehicle. It should be understood, however, that the inventive clutch is usable in virtually any vehicular or marine gear train. Gear train 10 includes a housing 12 in which are rotatably mounted a first clutch assembly 14, a second clutch assembly 16, a compound shaft assembly 18, and a third clutch assembly 20. The first and second clutch assemblies 14 and 16 transfer torque from a drive spider (not shown) to the compound shaft assembly 18 and the third clutch assembly 20, and the third clutch assembly 20 is mounted on and transfers torque to an output shaft 22. The clutches of the third clutch assembly 20 form no part of the present invention and, accordingly, will not be described in further detail.

The first clutch assembly 14 includes two clutches 26, 28 which both are mounted on and receive torque from a first or primary drive shaft 24 and which transfer torque from shaft 24 to respective pinions 27 and 29. The drive shaft 24 is rotatably mounted in the housing 12 by inner and outer bearings 30 and 32 and is attached to the drive spider or the like by a yoke 34 extending inwardly from the housing 12. ("Inwardly" and "outwardly" as used herein are merely conventions with "inwardly" meaning towards the drive spider or to the left as viewed in FIGS. 2–4 and "outwardly" meaning away from the drive spider or to the right as viewed in FIGS. 2–4). A drive gear 36 is mounted on the first drive shaft 24 and constantly meshes with a driven gear 38 on a second drive shaft 54. The pinion 27 of the first clutch 26 meshes with a gear 82 on the compound shaft assembly 18 and with a pinion 64 of the second clutch assembly 16. The pinion 29 of the second clutch 28 is coupled to a driven gear 68 of the compound shaft assembly 18. The meshing relationships between the pinions 27, 29 and the gears 82, 68 of the compound shaft assembly 18 cannot be seen in FIG. 2 due to the configuration of the section line along which this Figure is taken. These relationships, however, are illustrated (at least schematically) in FIGS. 3 and 4.

First and second supply passages 50 and 52 are formed in the shaft 24. Fluid flow into and out of these passages is controlled by a valve assembly 44, shown only schematically and only in FIGS. 1–3. The valve assembly 44 is electronically controlled by solenoids 46 and 48 and selectively and alternatively couples the passages 50 and 52 to a pressure source such as a pump 88 and to sump 92 (FIG. 3). More specifically, as is standard in the art, the valve assembly 44 is actuatable to selectively: 1) permit pressurized hydraulic fluid flow from the pressure source or pump 88 to the first clutch 26 through the first supply passage 50 while simultaneously venting the second supply passage 52 for the second clutch 28 to sump 92 and 2) supply pressurized fluid to the second clutch 28 via the second supply passage 52 while venting the first supply passage 50 for the first clutch 26. The clutches 26 and 28 may also be pressurized simultaneously by appropriate control of solenoids 46 and 48 during shifting to provide a relatively smooth shift. A conventional lubricating passage 93 is also formed in the shaft 24 and supplies lube oil to the bearings, etc.

The second clutch assembly 16 similarly includes two clutches 60, 62 which both are mounted on and receive torque from a second drive shaft 54 and which transfer torque from shaft 54 to respective pinions 64 and 66. The second drive shaft 54 is rotatably mounted in the housing 12 by inner and outer bearings 56, 58. The pinion 64 of the first clutch 60 is, as discussed above, coupled with the pinion 27 of the first clutch 26 of the first clutch assembly 14. The pinion 66 of the second clutch 62 is coupled directly with the outer gear 68 of the compound shaft assembly 18. Operation of the first and second clutches 60 and 62 is controlled by a valve assembly 70 shown only schematically and only in FIGS. 1 and 2 and electronically controlled by solenoids 72, 74.

The compound shaft assembly 18 includes a shaft 76 rotatably mounted in the housing 12 via bearings 78 and 80. Mounted on the shaft 76 are 1) an inner gear 82 (described above) meshing with the pinion 27 of clutch 26, an intermediate gear 94 meshing with a first pinion 96 of the third clutch assembly 20, and 3) an outer gear 68 (described above) meshing with the pinions 29 and 66 of clutches 28 and 62 and with a second pinion 98 of the third clutch assembly 20. The manner in which the compound shaft assembly 18 interacts with clutch assemblies 14, 16, and 20 to couple the drive spider to the output shaft 22 is per se well known and will not be described in detail.

The construction and operation of the first and second clutches 26, 28 and 60, 62 of each of the first and second clutch assemblies 14 and 16 is nearly identical to one another. The following discussion will therefore be limited for the most part to the second clutch 28 of the first clutch assembly 14, it being understood that the first clutch 26 of the first clutch assembly 14 and the first and second clutches 60 and 62 of the second clutch assembly 16 are in all inventive aspects identical in construction and operation to clutch 28.

3. Construction of the Second Clutch of the First Clutch Assembly

Figure 4:
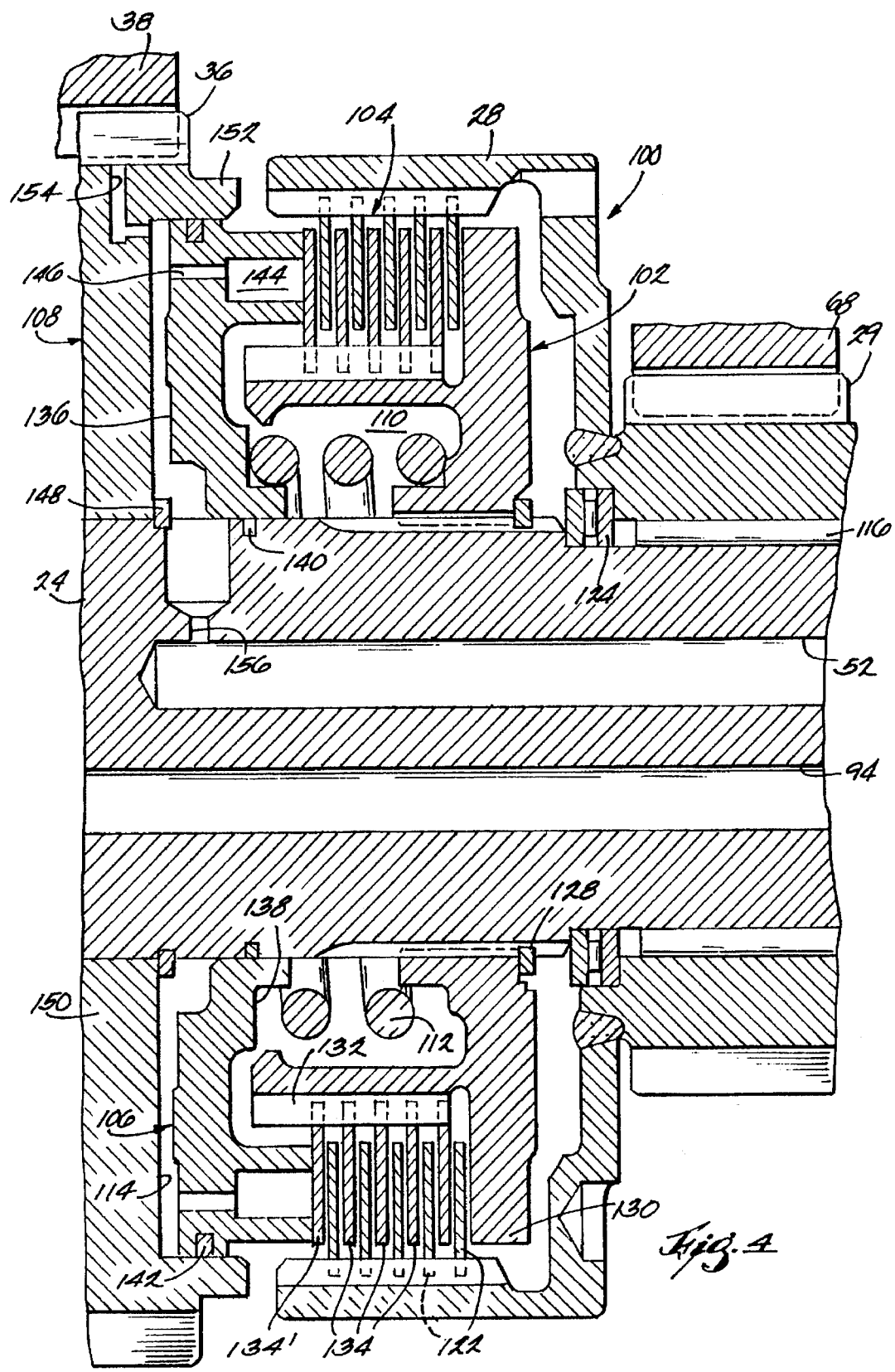
FIG. 4 is an enlarged view of one of the clutches of the assembly of FIG. 3 and illustrating the clutch in an engaged position.
Figure 5:
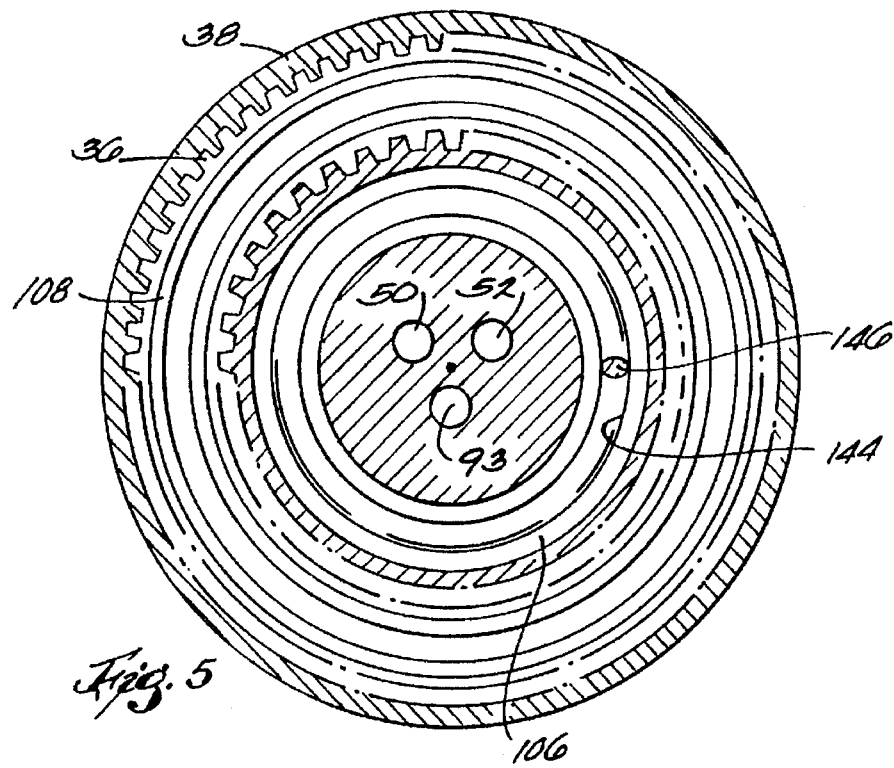
FIG. 5 is a sectional end elevation view taken along the lines 5—5 in FIG. 3.

Referring now in particular to FIGS. 3–5, the second clutch 28 includes, from outer to inner end, a drive ring 100, a backplate 102, a clutch plate stack 104, an actuating piston 106, and a piston carrier 108, all of which are mounted on the first or primary drive shaft 24. The shaft 24, backplate 102, piston 106, and drive ring 100, in combination, define a clutch plate chamber 110 in which are disposed the clutch plate stack 104 and a return spring 112. The piston carrier 108 and piston 106, in combination, define an actuating chamber 114 into which hydraulic fluid selectively flows to actuate the clutch 28.

Drive ring 100 is mounted on the drive shaft 24 for relative rotation therebetween by a needle bearing 116 and is fixed from axial movement with respect to the shaft 24 by inner and outer rings 124 and 126. The drive ring 100 forms the driven element of the clutch 28 and also encases the clutch plate stack 104. To this end, drive ring 100 has an enlarged inner end 118 and an outer end 120. The enlarged inner end 118 is hollow to partially encompass the clutch plate chamber 110 and is splined on its inner radial periphery to receive a first plurality 122 of clutch plates. The outer end 120 is rigidly attached to the inner end 118 and presents the pinion 29 meshing with the driven gear 68 as discussed above.

The backplate 102 is affixed to the shaft 24 proximate the outer end of the enlarged portion 118 of the drive ring 100 by a snap ring 128. Backplate 102 includes 1) a vertical leg 130 which forms the backstop for the clutch plate stack 104 upon clutch engagement and 2) a horizontal leg 132 which is splined on its outer radial periphery to receive a second plurality 134 of clutch plates.

The innermost clutch plate 134' is coned to facilitate release of the clutch 28. Testing revealed that this plate tends to stick to the piston 106 during release, thereby inhibiting clutch disengagement. The cone-shaped plate 134' acts as a belleville spring biasing the plate 134' away from the piston 106. Other devices could also be suitable for this purpose. For instance, a sliding pin could be provided which extends through the piston 106 and which is slightly longer than the piston's axial length. When the piston 106 returns completely to the released position upon clutch disengagement, the pin would extend beyond the piston face, thereby forcing the adjacent plate away from the piston.

The actuating piston 106 is slidably and sealingly mounted on the drive shaft 24 so as to be capable of engaging and compressing the disk plate stack 104 upon the admission of pressurized hydraulic fluid into the actuating chamber 114. The piston 106 is also designed to reduce the rate of pressure increase in the actuating chamber 114 for a period of time after initial clutch engagement thereby to avoid shift shock. Towards these ends, the piston 106 has a first or inner axial surface 136 facing the piston carrier 108 and a second or outer axial surface 138 facing the clutch plate stack 104 and engaging the innermost clutch plate 134' when the clutch 28 is engaged. The piston 106 is slidably sealed to the shaft 24 and piston carrier 108 by an inner sliding seal 140 engaging the shaft 24 and an outer sliding seal 142 engaging the piston carrier 108.

A face cavity 144 is formed in the second or outer surface 138 of the piston 106 and communicates with the actuating chamber 114 via an axial bore or face orifice 146 extending from the inner surface 136 of piston 106 to the face cavity 144. To function properly, the face cavity 144 should, upon initial clutch engagement, be positioned in a location in which it seals against the plate 134', thereby forming a contained volume or accumulator which can be filled with fluid flowing thereinto from the actuating chamber 114 and the face orifice 146. The face cavity 144 should also be 1) large enough to accommodate sufficient fluid to delay the pressure increase in the actuating chamber 114 and resulting clutch lock-up as desired, and 2) relatively easy to form in order to minimize production costs. These goals can best be achieved by providing a single annular face cavity 144 which is counter-bored into the outer surface 138 of the piston 106 and which is sufficiently large (typically two to three in.$^3$) to accommodate at least 25%, and preferably up to 50%, of the total volume of fluid flowing into the actuating chamber 114 upon clutch engagement. It may be possible and even desirable to provide a still larger face cavity, but it is currently believed that the added benefits of providing a face cavity capable of holding more than half of the total fluid flowing into the actuating chamber 114 may compromise the strength of the piston 106.

It should be emphasized that the face cavity 144 could take many forms other than the preferred form described above. For instance, the face cavity need not extend around the entire circumference of the piston 106. Moreover, it could be formed from several separate arcuate or even circular cavities, each of which communicates with the actuating chamber 114 via one or more axial bores.

The piston carrier 108 forms the functional center of the clutch assembly 14 and is capable of 1) forming the end of both clutches 26 and 28 of the assembly 14 and 2) presenting the drive gear 36 on its outer peripheral surface. A flange 152 is formed on the piston carrier 108 radially adjacent drive gear 36 and extends axially outwardly from the main body 150 of the piston carrier 108. The inner radial surface of the flange 152 slidably receives the outer seal 142 thereby to guide the piston 106 and to define the outer boundary of the actuating chamber 114. A bleed orifice 154 is formed in the outer end portion of the piston carrier body 150 to permit limited drainage of fluid out of the actuating chamber 114, through the piston carrier 108, and back to the sump 92. This bleed orifice 154 helps release the clutch 28 by draining oil out of the actuating chamber 114 that otherwise could be trapped and centrifugally generate a thrust on the piston 106. It also speeds the decay of clutch pressure when a clutch disengagement command is generated.

A restricted axial flow orifice 156 is provided in the drive shaft 24 for connecting the supply passage 52 to the actuating chamber 114. The orifice 156 1) reduces the required size of the face cavity 144 and actuating chamber 114, 2) reduces the effect of manufacturing variations on oil flow restriction in the supply passage 52, and 3) reduces the effects of variations in oil temperature and viscosity on the system.

4. Operation of Clutch

The clutch 28 normally maintains the position illustrated in FIG. 3 in which the actuating chamber 114 is unpressurized and the piston 106 is biased by the return spring 112 away from the clutch plates 122 and 134 (to the left as viewed in the drawings). Upon generation of a clutch engagement command, solenoid 48 is energized to actuate the valve assembly 44 thereby to admit pressurized hydraulic fluid into the passage 52. The pressurized hydraulic fluid then flows into the actuating chamber 114 from passage 52 and orifice 156. Fluid in the actuating chamber 114 drives the piston 106 to the right as viewed in the drawings from the position illustrated in FIG. 3 in which it is spaced from the clutch plate stack 104 to the position illustrated in FIG. 4 in which it compresses the clutch plate stack to engage the clutch.

Clutch engagement does not occur instantaneously but takes place over time due to a relatively gradual pressure increase in the actuating chamber 114 resulting from the effects of the face cavity 144 on the system. The pressure history in the actuating chamber 114 and thus the torque transfer history is illustrated by the curve 160 in FIG. 6. Curve 160 does not represent dynamic effects, viscous pressure losses, or mechanical resiliency, but does approximate the timing and pressure levels experienced in testing.

The clutch engagement process takes place as follows:

Almost immediately after fluid flows into the actuating chamber 114, the fluid pressure therein rises sufficiently to overcome the weak biasing force of return spring 112 to drive the piston to the right at time $T_0$. Continued flow of fluid into the actuating chamber 114 continues to drive the piston 106 towards the clutch plate stack 104 until the piston 106 compresses the clutch plate stack 104 to initially apply the clutch 28 at time $T_1$ (typically occurring about 0.18 seconds after time $T_0$). Although some fluid flows out of the actuating chamber 114 through the bleed orifice 154 and the axial bore 146 during this period, the amount of fluid flowing out of the chamber 114 as compared to that flowing into the chamber through the much larger orifice 156 is so small as to be negligible.

At time $T_1$, the face cavity 144 seals against clutch plate 134' to form an accumulator, and fluid may enter or leave the face cavity 144 only through the face orifice 146. Clutch pressure rises for a short time until pressure-flow equilibrium is again achieved at time $T_2$. The clutch 28 is now engaged and delivering torque proportionally to the clutch pressure $P_2$ which is only a small fraction (typically about ¼) of system pressure $P_3$. This pressure is determined primarily by the supply pressure delivered by pump 88 and its accompanying pressure control valves (not shown), the diameter of the inlet orifice 156, and the diameter of the face orifice 146.

Figure 6:
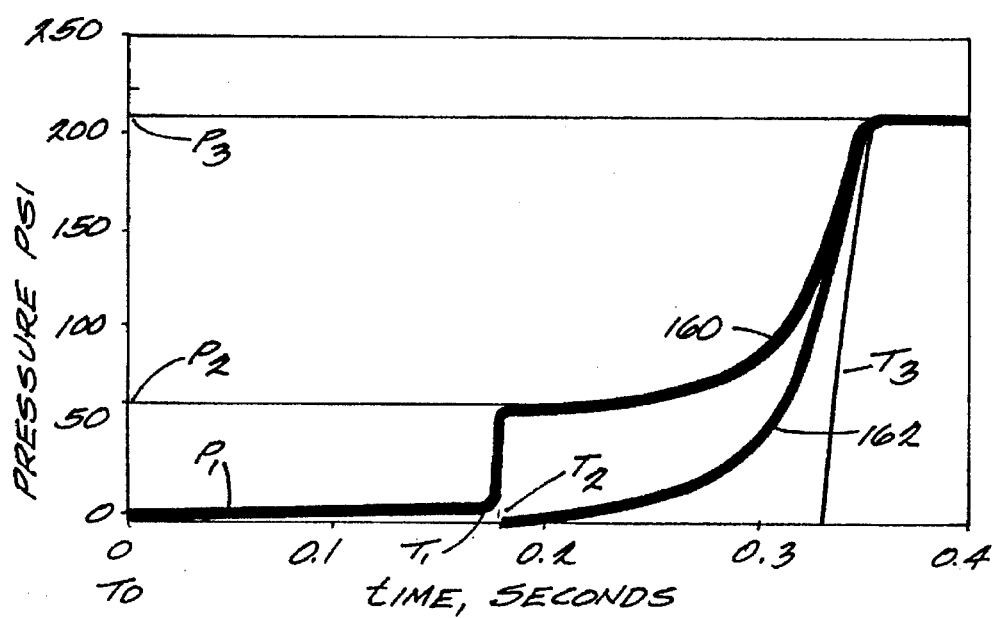
FIG. 6 is a graph illustrating clutch pressure and face cavity pressure versus time during engagement of the clutch of FIGS. 3–5.

Next, from period $T_2$ to $T_3$, fluid continues to flow into the face cavity 144 from the actuating chamber 114 and face orifice 146, thereby filling the face cavity 144 and increasing the fluid pressure therein as represented by the curve 162 in FIG. 6. Fluid flow into the face cavity 144 reduces the rate of pressure increase in actuating chamber 114, thereby delaying the time period from initial clutch engagement to lock-up and reducing shift shock. The rate of pressure increase may be reduced still further by air flow into the actuating chamber 114 from the face cavity 144 and face orifice 146 upon initial movement of the piston 106. A portion of this air is at least temporally trapped in the actuating chamber 114, thereby providing a cushioning effect due to the fact that the air is more compressible than oil.

Fluid flow into the face cavity 144 continues until the face cavity is filled with fluid and the pressure therein rises to equal the supply pressure $P_3$ at time $T_3$. By this time, the clutch 28 will have become fully engaged or locked up. Then, flow to the face cavity 144 stops, face cavity pressure equals clutch pressure, and clutch pressure is equal or nearly equal to the supply pressure $P_3$. Clutch engagement is now complete.

Assuming now that clutch disengagement is desired, the control valve assembly 44 is deactivated to cut off the supply of oil to the passage 52 and to allow hydraulic fluid to flow back through the valve assembly 44 and then to sump 92. Fluid flow out of the actuating chamber 114 is limited to flow through the bleed orifice 154 and through the inlet passage 156 for a time until the plate 134' returns to its cone shape, thereby unseating the plate 134' from the face cavity 144 and permitting the residual fluid pressure therein to be dumped into the clutch plate cavity 110. As discussed above, the bleed orifice 154 aids in clutch release by draining oil out of the actuating chamber 114 that otherwise may centrifugally generate a thrust on the piston 106. Fluid also may drain out of the actuating chamber 114 through the face orifice 146 at this time.

It can be seen from curves 160 and 162 that, from time $T_2$ to time $T_3$, the face cavity 144 acts as an accumulator, delaying the time at which the clutch 28 locks up (which would happen almost immediately after time $T_1$ in the absence of the face cavity 144) and possibly permitting the clutch 28 to lock up at less than full system pressure, depending on other operating circumstances. These effects are achieved primarily because between 25% and 50% of all of the fluid flowing into the actuating chamber 114 flows into the face cavity 144. In the Sieverkropp system, on the other hand, less than 1% of the total fluid admitted to the clutch flows through the bleed orifice. Shift shock is thereby greatly reduced without having to provide complex piston/flow path arrangements. The present invention therefore does not require a stepped piston or a third seal, whereas the device described in the Sieverkropp patent does. Fabrication and assembly are thereby significantly simplified and the chances of system failure reduced.

Many changes and modifications may be made for the present invention without departing from the spirit thereof. The scope of some of these changes are discussed above, and the scope of others will become apparent from the appended claims.

I claim:

1. An apparatus comprising:
   a rotatable drive element;
   a rotatable driven element; and
   a clutch which selectively couples said drive element to said driven element, said clutch including
      a plurality of interleaved clutch plates extending between said drive element and said driven element, and
      a hydraulically actuated piston which is slidable axially of said clutch assembly, said piston having a first axial surface subjectable to hydraulic actuating fluid and an opposed second axial surface facing said clutch plates and engaging one of said clutch plates when said clutch assembly is engaged, wherein said second axial surface has an arcuate face cavity formed therein extending around at least substantially an entire circumference thereof, wherein a bore extends through said piston from said first surface to said face cavity, and wherein said piston seals against said one clutch plate upon clutch engagement to form an accumulator within said face cavity.

2. An apparatus as defined in claim 1, wherein said face cavity is annular and has a volume of at least 2 in$^3$.

3. An apparatus as defined in claim 1, wherein said one plate is cone-shaped.

4. An apparatus as defined in claim 1, wherein said input member comprises a shaft and said output member comprises a pinion rotatably mounted on said shaft, said apparatus further comprising a piston carrier which is mounted on said shaft and which defines an actuating chamber between said piston carrier and said first surface of said piston, and further comprising a seal assembly which seals said piston to said piston carrier and to said shaft.

5. An apparatus as defined in claim 4, wherein said seal assembly consists of a first seal which seals an inner radial portion of said piston to said shaft and a second seal which seals an outer radial portion of said piston to said piston carrier.

6. An apparatus as defined in claim 4, wherein a fluid passage is formed in said shaft and has an inlet connected to a source of pressurized fluid and an outlet opening into said actuating chamber, said passage providing the sole path for fluid flow from said source to said piston.

7. A transmission gear train comprising:
   a housing;
   a rotatable drive shaft at least partially disposed in said housing;
   a rotatable driven shaft; and
   a clutch which selectively couples said driven shaft to said drive shaft, said clutch including
      a piston carrier which is non-rotatably attached to said drive shaft,
      a drive ring which is rotatably mounted on said drive shaft and which presents a pinion which is coupled to said driven shaft;
      a backplate which is non-rotatably mounted on one of said drive ring and said drive shaft,
      a hydraulically actuated piston which is slidably mounted on said drive shaft, which is sealed to said piston carrier and said drive shaft, and which defines, in combination with said backplate, said drive shaft, and said drive ring, a clutch plate chamber, and
      a plurality of interleaved clutch plates disposed in said clutch plate chamber, wherein
         said piston has a first axial surface facing said piston carrier and a second axial surface facing said clutch plates and engaging one of said clutch plates when said clutch is engaged,
         said second axial surface has an arcuate face cavity formed therein extending around at least substantially an entire circumference thereof, and wherein
         a bore extends through said piston from said first surface to said face cavity.

8. An apparatus as defined in claim 7, further comprising a bleed orifice extending through said piston carrier and opening into an actuating chamber located between said piston carrier and said piston.

9. An apparatus as defined in claim 7, wherein said seal assembly consists of a first seal which seals an inner radial portion of said piston to said drive shaft and a second seal which seals an outer radial portion of said piston to said piston carrier.

10. An apparatus as defined in claim 8, wherein a fluid passage is formed in said drive shaft and has an inlet connected to a source of pressurized fluid and an outlet opening into said actuating chamber, said passage providing the sole path for fluid flow from said source to said piston.

11. An apparatus as defined in claim 10, wherein said fluid passage has a flow restrictor formed therein.

12. An apparatus as defined in claim 7, wherein said drive shaft comprises a first drive shaft, said clutch comprises a first clutch, and said piston carrier presents a drive gear, and further comprising
   a driven gear on said driven shaft which meshes with said pinion;
   a second drive gear which is driven by said drive gear on said piston carrier of said first clutch, and
   a second clutch which selectively couples said driven gear to said second drive shaft, said second clutch including
      a piston carrier which is non-rotatably attached to said second drive shaft, a drive ring which is rotatably mounted on said second drive shaft and which presents a pinion which is coupled to said driven gear;

a backplate which is non-rotatably mounted on one of said drive ring and said second drive shaft, a hydraulically actuated piston which is slidably mounted on said second drive shaft, which is sealed to said piston carrier and said second drive shaft, and which defines, in combination with said backplate, said drive shaft, and said drive ring, a clutch plate chamber, and a plurality of interleaved clutch plates disposed in said clutch plate chamber, wherein said piston has a first axial surface facing said piston carrier and a second axial surface facing said clutch plates and engaging one of said clutch plates when said second clutch is engaged, said second axial surface has an arcuate face cavity formed therein extending around at least substantially an entire circumference thereof, and wherein a bore extends through said piston from said first surface to said face cavity.

13. A transmission gear train comprising:

a housing;

a rotatable drive shaft at least partially disposed in said housing;

a rotatable driven shaft; and a clutch which selectively couples said driven shaft to said drive shaft, said clutch including a piston carrier which is non-rotatably attached to said drive shaft, a drive ring which is rotatably mounted on said drive shaft and which presents a pinion which is coupled to said driven shaft;

a backplate which is non-rotatably mounted on one of said drive ring and said drive shaft, a hydraulically actuated piston which is slidably mounted on said drive shaft, and which defines, in combination with said backplate, said drive shaft, and said drive ring, a clutch plate chamber, wherein an actuating chamber is formed between said piston carrier and said piston, a plurality of interleaved clutch plates disposed in said clutch plate chamber, wherein said piston has a first axial surface facing said piston carrier and a second axial surface facing said clutch plates and engaging one of said clutch plates when said clutch is engaged, a seal assembly for said piston, said seal assembly consisting of a first seal which seals an inner radial portion of said piston to said shaft and a second seal which seals an outer radial portion of said piston to said piston carrier, wherein said second axial surface of said piston has an annular face cavity formed therein, said face cavity has a volume of at least 2 in.$^3$, an axial bore extends through said piston from said first surface to said face cavity, and a passage extends through said drive shaft, has an outlet opening into said actuating chamber, and forms the sole source of actuating fluid for said piston.

14. A method comprising (A) providing a clutch including a clutch plate stack formed from a plurality of interleaved clutch plates extending between a rotating drive element and a rotatable driven element, and a hydraulically actuated piston which is slidable axially of said clutch, said piston having a first axial surface facing an actuating chamber and an opposed second axial surface facing said clutch plates, wherein said second axial surface has a face cavity formed therein and a bore extends through said piston from said first surface to said face cavity;

(B) supplying pressurized fluid to said actuating chamber to thereby drive said piston into engagement with one of said clutch plates, seal said piston against said one clutch plate, and compress said clutch plate stack and initiate clutch engagement, wherein fluid pressure remains at a pressure during said step (B) which is insufficiently high to fully engage said clutch; and then (C) supplying additional pressurized fluid to said actuating chamber while filling said face cavity with pressurized hydraulic fluid flowing into said face cavity from said actuating chamber, thereby fully engaging said clutch.

15. A method as defined in claim 14, wherein said step of providing said piston comprises providing a piston having an arcuate face cavity formed therein extending around at least substantially an entire circumference of said piston.

16. A method as defined in claim 14, wherein, during said step (C), the volume of fluid flowing into said face cavity is at least 25% of the total volume of fluid flowing into said actuating chamber during said steps (B) and (C).

17. A method as defined in claim 16, wherein, during said step (C), the volume of fluid flowing into said face cavity is between 25% and 50% of the total volume of fluid flowing into said actuating chamber during said steps (B) and (C).

18. A method as defined in claim 14, wherein the period of said step (C) is at least 0.5 the period of said step (B).

19. A method as defined in claim 18, wherein the period of said step (C) is at least 0.75 the period of said step (B).

20. A method comprising (A) providing a clutch including a clutch plate stack formed from a plurality of interleaved clutch plates extending between a rotating drive element and a rotatable driven element, and a hydraulically actuated piston which is slidable axially of said clutch, said piston having a first axial surface facing an actuating chamber and an opposed second axial surface facing said clutch plates, wherein said second axial surface has an annular face cavity formed therein and a bore extends through said piston from said first surface to said face cavity;

(B) supplying pressurized fluid to said actuating chamber to thereby drive said piston into engagement with one of said clutch plates, seal said piston against said one clutch plate, and compress said clutch plate stack and initiate clutch engagement, wherein fluid pressure remains at a pressure during said step (B) which is insufficiently high to fully engage said clutch, and wherein said step (B) takes place over a time period $T_1$; and then (C) supplying additional pressurized fluid to said actuating chamber while filling said face cavity with pressurized hydraulic fluid flowing into said face cavity from said actuating chamber, thereby fully engaging said clutch, wherein the volume of fluid flowing into said face cavity is at least 25% of the total volume of fluid flowing into said actuating chamber during said steps (B) and (C), and wherein said step (C) takes place over a time period $T_2$ which is at least 0.5 $T_1$.

* * * * *